United States Patent [19]

Endres et al.

[11] Patent Number: 4,490,933
[45] Date of Patent: Jan. 1, 1985

[54] INTERNALLY ILLUMINATED DISPLAY STRUCTURE

[75] Inventors: Ludwig Endres, Gröbenzell; Ruald Nellis, Munich, both of Fed. Rep. of Germany

[73] Assignee: Patent-Truehand-Gesellschaft fur Elektrische Gluhlampen GmbH, Munich, Fed. Rep. of Germany

[21] Appl. No.: 409,597

[22] Filed: Aug. 19, 1982

Related U.S. Application Data

[63] Continuation of Ser. No. 231,954, Feb. 6, 1981, abandoned.

[30] Foreign Application Priority Data

May 21, 1980 [DE] Fed. Rep. of Germany ....... 3019419

[51] Int. Cl.³ .............................................. G09F 13/04
[52] U.S. Cl. ................................. 40/564; 40/204,541
[58] Field of Search ............... 40/564, 541, 542, 544, 40/570, 579, 451, 580, 448, 574, 576, 571, 572, 578, 427; 362/23, 28, 29, 31, 84, 346; 40/204, 543, 582, 575

[56] References Cited

U.S. PATENT DOCUMENTS

| | | | |
|---|---|---|---|
| 2,015,170 | 9/1935 | Ward | 40/543 |
| 2,104,230 | 1/1938 | Kiss | 40/204 |
| 2,152,353 | 3/1939 | Lewin | 40/543 |
| 2,213,868 | 9/1940 | Lucian | 40/543 |
| 2,354,018 | 7/1944 | Heltzer et al. | 40/582 |
| 2,579,230 | 12/1951 | Giboney | 40/204 |
| 2,878,606 | 3/1959 | Meijer | 40/618 |
| 2,900,491 | 8/1959 | Barenzi et al. | 40/204 |
| 3,173,985 | 3/1965 | Wendel | 40/582 |
| 3,225,470 | 12/1965 | Schwab et al. | 40/543 |
| 3,521,391 | 7/1970 | Murai | 40/204 |
| 3,562,942 | 2/1971 | Mabrey | 40/570 |
| 3,707,792 | 1/1973 | Mabrey et al. | 40/575 |
| 3,921,324 | 11/1975 | Flannery | 40/204 |
| 4,071,883 | 1/1973 | Dennis | 40/574 |
| 4,229,783 | 10/1980 | Eberhardt | 40/564 |
| 4,335,421 | 6/1982 | Modia et al. | 362/346 |

Primary Examiner—Paul J. Hirsch
Attorney, Agent, or Firm—Frishauf, Holtz, Goodman & Woodward

[57] ABSTRACT

To provide a uniformly illuminated panel of essentially uniform brightness throughout, although illuminated by essentially point source lamps, a box-like structural element (1) is provided having a light emitting surface (2) which has, in the direction of transmission of radiation therethrough, a ratio of reflection to transmission of radiation greater than 50%, and preferably between 80% to 95%, the interior wall surfaces of the hollow structure being reflective, and the hollow structure having a depth dimension, for example about 2 cm, which is small with respect to the height and width dimensions.

19 Claims, 3 Drawing Figures

INTERNALLY ILLUMINATED DISPLAY STRUCTURE

This is a continuation of application Ser. No. 231,954 filed Feb. 6, 1981 now abandoned.

Cross reference to related application, assigned to the assignee of the present application:

U.S. Ser. No. 231,956, filed Feb. 6, 1981, ENDRES, NELLIS & RASCH "Illuminated Display Panel Structure" now abandoned.

The present invention relates to an illuminated panel, and more particularly to a panel which is useful to provide indicating displays, especially as the dashboard in automotive vehicles, in which display data are made visible by passing light therethrough.

BACKGROUND

Various types of display panels and display fields are known, in which one or more lamps are located behind a panel. The lamps may have reflectors in order to reflect light emitted from the lamps to the area to be illuminated. The efficiency of illumination is low, since the ratio of the light which is generated to that which actually passes through the panel is low. The uniformity of illumination, likewise, is frequently unsatisfactory unless a large number of lamps are used.

THE INVENTION

It is an object to provide an illuminated panel which is essentially uniformly illuminated so that any indicia, symbols, characters or displays will appear of uniform brightness, if such is desired, and which is small, easily made, and requires only little operating power.

Briefly, a display surface is formed as an indicator panel which has a ratio of light reflection to transmission greater than 0.5, so that the reflectivity of the indicator panel is higher than its light transmissivity. The panel forms one surface of a box-like hollow element which includes at least one radiation emitting lamp. The box-like element is so dimensioned that its depth is several times smaller than the other dimensions, that is, the width or height thereof. Preferably, the depth is no more than 2 cm. The interior wall surfaces of the box-like element are radiation-reflective essentially entirely throughout their surfaces.

The internal reflectivity of the display surface in combination with the other interior wall surfaces of the element result in multiple reflection of light within the box-like element. Consequently, the display surface will be essentially uniformly illuminated from within regardless of the specific position of any unit area with respect to the lamps within the box-like element.

The interior surface, in one form of the invention, only reflects the emitted radiation, in which case the radiation emitted by the lamp is, preferably, in the visible range. The interior surface may, however, also be such that the wave length of the radiation emitted by the lamp is converted into visible light; thus, if the lamp radiates with light rich in ultra-violet (UV) radiation, the interior wall surface can be such that it converts the UV radiation to visible light. Likewise, the display surface can have such conversion characteristics. Preferably, if the lamp radiation is rich UV emission, the interior surface of the box-like element both converts the UV radiation into visible light and provides for multiple reflection of the visible light, as well as of such initial UV radiation as may impinging thereon. The panel forming the display surface can likewise additionally convert UV radiation impinging thereon to visible light for transmission therethrough.

The interior surfaces of the box-like structure can be smooth or entirely or partly of corrugated, striated, or other shape, and can be so arranged that particular regions of the display panel are highlighted, that is, receive a greater density of light than the remainder in order to specifically stress indications from specific regions or zones thereof. For example, a portion of the back wall of the hollow element can be prismatic.

The light sources used may be incandescent lamps or discharge lamps, or one or more UV radiation emitting lamps. The surface of the interior wall of the hollow element is then selected to match the radiation emitted by the radiation source therein. If light sources such as incandescent lamps are used, the interior surfaces other than the display panel preferably have a reflectivity of at least 95%. If the radiation sources are emitting in the UV range, the surfaces preferably are such that the UV radiation is converted into visible radiation; the surfaces, additionally, should be reflective with respect to visible and/or UV radiation. The panel may, additionally, include fluorescent material which converts UV radiation into visible radiation. The reflective wall can be formed as a reflective layer or as a pigmentation of the element structure as such. The light reflecting layer may, for example, be a white coating which does not yellow, and as well known in the literature relating to photometry.

The indicia can be formed as transparent areas in an opaque mask, placed on the display panel surface of the element, covered with a diffusion medium, for example a diffusion glass layer, diffusion glass, a colored or diffusing transparent foil or the like. The box-like element is closed.

The principle of essentially uniform light output is based on multiple reflection, which results in essentially uniform illumination of the entire area of the display panel although only one or preferably two or a few essentially point-like light sources are used. Multiple reflection can be obtained only in such an element, however, if it is constructed and arranged in a specific way.

To obtain essentially uniform illumination of the surface, the display surface has, in the direction of transmission of radiation, that is, from the inside of the box-like structure out, a ratio of reflection to transmission greater than 0.5. The display surface, in combination with the other interior wall surfaces of the element, thus will provide for multiple reflection of light therein.

Display panels used in the dashboard of automotive and similar vehicles must be shallow, since space is at a premium. The illumination display system has the advantage of requiring only little depth. The depth of the box-like element can be less than one-third of the remaining dimensions. Sufficient mixing and multiple reflection of light is obtained even if such display element structures are only about 2 cm deep, or even more shallow.

Depending on use, the sources emitting visible light or other radiation are so located within the box-like element that essentially all direct radiation therefrom is retained within the box-like element. If it is required to highlight specific areas which are located close to the lamps, then direct radiation can additionally be provided at these specific areas by locally reducing the reflectivity so that the transmissivity in those regions is increased. Those regions or zones should be small with respect to the overall area of the display panel to avoid loss of reflected light within the box-like element. The overall efficiency of conversion of light is improved by holding the dimensions of the lamps small with respect to the overall dimensions of the box-like element, since the lamps will cause only little interference of the multiple reflection. Halogen incandescent lamps are particularly suitable due to their small dimensions.

The system is particularly suitable for combination with liquid crystal displays (LCDs) used in automotive vehicles for dashboard indication of operating or performance data.

The structure is economical in space and thus can be easily fitted in the dashboard space. The illumination efficiency obtained is at least twice that of known arrangements using reflectors since the box-like hollow element is constructed to obtain multiple reflection from the available light sources. Thus, the power requirements of the lamps, for a given size of display, can be reduced over prior art structures. The arrangement has the further advantage that only a few, for example two, essentially point source lamps can be used which are introduced into the box-like element through openings formed in the side walls thereof and, although only two such lamps are used, high and essentially uniform density of illumination is obtained. The box-like hollow element with the lamps assembled therein can be constructed as a closed unit for ease of assembly in a dashboard arrangement, for example by snap-in connections or the like. Thus, the entire display panel can be assembled without requiring additional mounting hardware or arrangements.

Drawings

Figure 1:
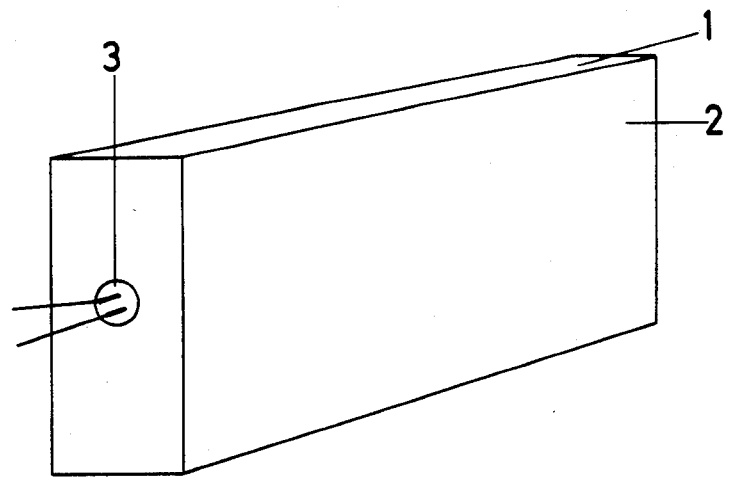
FIG. 1 is a perspective view of the hollow box-like element.
Figures 2, 3:
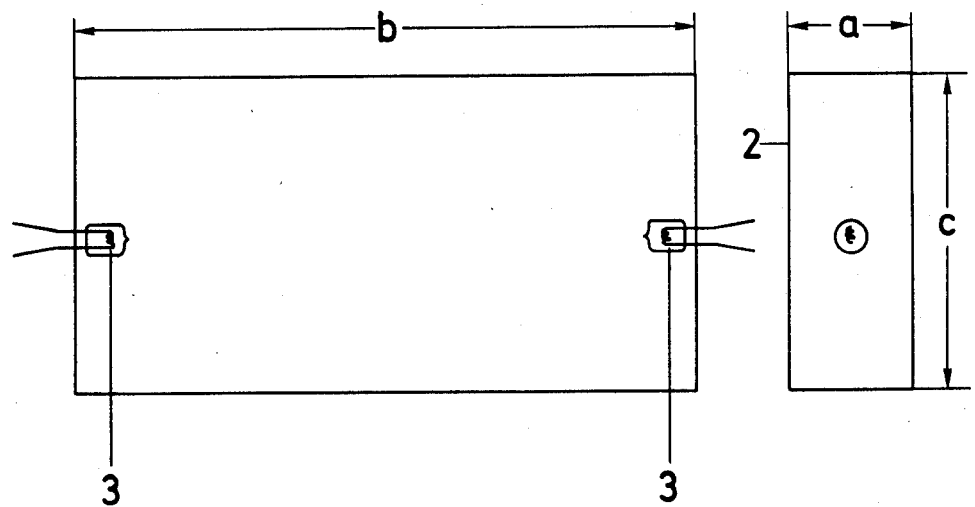
FIG. 2 is a back view, with the back wall removed.
FIG. 3 is a schematic cross-sectional view through the hollow box-like element.

Referring to the drawings: The box-like structure 1 is preferably made of polyester, but may be of sheet metal or other structural material. Suitable dimensions, in one example, are for example (FIGS. 2, 3): depth a: 2 cm; width b: 20 cm; height c: 10 cm. The hollow, box-like element or structure 1 preferably consists of a polyester which has white pigment dispersed therein or, alternatively, has a dull-white coating at the inside surfaces. Alternatively, the structure may be made of sheet metal with a suitable non-yellowing white paint or lacquer applied thereto, preferably of dull, diffusing surface texture. The front panel 2 preferably consists of a layer of polyester which has white pigment dispersed therein, or which is coated with white pigment, again to be non-glossy or dull-white and diffusing. The reflectivity of the surface preferably approaches about 90%, and the transmissivity is preferably in excess of 5%. The interior surface of the structure 1, with the exception of the front panel 2, has the characteristic of diffused or rough white coloring, which may be inherent in the material, or may be applied as a coating, so that the internal reflectivity of the structure approaches and preferably exceeds 95%. The light radiation sources 3 are two halogen incandescent lamps of 5 W power rating, integrated or attached into the structure 1. The front surface 2 may have an LCD crystal display surface applied thereto, possibly with interposition of a mask (not shown), and possibly with desired indicating symbols. The specific symbols, upon proper control of the LCD, then will be illuminated by multiple reflection to the panel 2 with concentrated illumination.

Generally, the surface 2 should have a reflectivity between 80% and 95%, and a transmissivity between 20% to 5%, the remaining interior surfaces having a reflectivity of at least 80%, and preferably even exceeding 95%. The extremely high reflectivity of all the surfaces, including the display panel surface, provides for multiple reflection of light from the lamps 3 to result in effectively uniform illumination of the display surface, although only two essentially point-source lightbulbs are used. Any two incremental areas on the display surface thus will receive essentially the same illumination, regardless of their position with respect to the lamp 3. Use of small bulbs such as halogen lamps which have dimensions which are small with respect to the remaining dimensions of the structure, has the advantage that multiple reflection is hardly impeded by the presence of the lamps themselves. Although only a few—in the example two—lightbulbs are used, and they are essentially point-shaped, the light passing through the panel is essentially of uniform intensity due to multiple reflection internally of the structure to which the internal reflectivity of the panel itself contributes.

We claim:

1. Vehicle interior panel structure or dashboard display structure having a display surface including an indicating panel, said structure comprising, in accordance with the invention, a closed hollow box (1);

at least one light radiation generating lamp (3) located within said hollow box, said box having a depth dimension (a), a width dimension (b), and a height dimension (c), in which said depth dimension is several times smaller than either of said other dimensions;

one surface defined by the width (b) times height (c) dimension forming one display surface, all the interior wall surfaces of said box, other than the display surface, having a reflectivity, within the spectral range of the light from said light radiation generating lamp or lamps (3), of at least 80% and being light radiation reflective essentially entirely throughout their surfaces, the light distribution within said box being essentially entirely dependent on the light reflecting characteristics of the interior wall surfaces defining said box, and wherein said display surface has an interior reflectivity of between 80% to 95%, and, in the direction of transmission of radiation, a radiation transmissivity of between 20% to 5% to provide at said display surface, and interiorily of said box a higher degree of reflectivity of light interiorily of said box than of transmissivity of light to and through the display surface, so that said display surface in combination with the other interior wall surfaces of the box, provides for multiple reflection of light in said box (1) to result in essentially uniform light at any two incremental areas on said display surface, regardless of the respective position of the incremental areas on said display surface with respect to said lamp, or lamps.

2. Structure according to claim 1, wherein the reflectivity of the interior wall surfaces other than the display surface is in the order of at least about 95%.

3. Structure according to claim 1, wherein the at least one light radiation emitting lamp (6) emits light in the visible spectral range.

4. Structure according to claim 1, wherein said at least one light radiation emitting lamp emits radiation in the ultraviolet (UV) range.

5. Structure according to claim 4, wherein the interior wall surfaces of said box (1) have the characteristic of converting impinging UV radiation into radiation in the visible spectral range;

and further have the characteristic of reflecting said light in the visible spectral range.

6. Structure according to claim 1, wherein the interior wall surfaces of said box (1) have a light reflecting coating.

7. Structure according to claim 1, wherein the material of said interior wall surfaces of said box is inherently light reflecting.

8. Structure according to claim 1, wherein the depth dimension (a) of said box is in the order of about one-third of one of said other dimensions.

9. Structure according to claim 1, wherein the depth dimension (a) of said box is up to about 2 cm only.

10. Structure according to claim 9, wherein said height dimension (c) of said box is in the order of up to about 10 cm only.

11. Structure according to claim 9, wherein two halogen incandescent lamps of about 5 W power consumption are provided within said hollow box and forming said at least one light radiation emitting lamp.

12. Structure according to claim 1, wherein the light radiation emitting lamp (3) comprises two halogen incandescent lamps.

13. Structure according to claim 1, wherein the depth dimension (a) of said box is up to about 2 cm only; and
wherein two halogen incandescent lamps of about 5 W power consumption are provided within said hollow box and forming said at least one light radiation emitting lamp.

14. Structure according to claim 13, wherein said height dimension (c) of said box is in the order of up to about 10 cm only.

15. Automotive dashboard panel forming an illuminated and liquid crystal display (LCD) combination panel, having
a closed hollow box (1);
at least one radiation generating lamp (3) located within said hollow box;
said box having a depth dimension (a), a width dimension (b), and a height dimension,
in which said depth dimension is several times smaller than either of said other dimensions;
one surface defined by the width (b) times height (c) dimension forming said display surface,
all the interior wall surfaces of said box, other than the display surface, have a reflectivity within the spectral range of the light from said light radiation generating lamp or lamps (3), of at least 80% and being light radiation reflective essentially entirely throughout their surfaces, the light distribution within said box being essentially entirely dependent on the light reflecting characteristics of the interior wall surfaces defining said box;
wherein said display surface has an interior reflectivity of between 80% to 95%, and, in the direction of transmission of light radiation, a radiation transmissivity of between 20% to 5% to provide at said display surface, and interiorily of said box a higher degree of reflectivity interiorily of said box than transmissivity of light to and through said display surface, so that said display surface, in combination with the other interior wall surfaces of the box, provides for multiple reflection of light within said box (1) to result in esssentially uniform light at any two incremental areas on said display surface, regardless of the respective position of the incremental areas of said display surface with respect to said lamp, or lamps;
and a liquid crystal display element located adjacent said display surface outside of said hollow box.

16. Panel according to claim 15, wherein the depth dimension (a) of said box is up to about 2 cm only;
wherein two halogen incandescent lamps of about 5 W power consumption are provided within said hollow box and forming said at least one light radiation emitting lamp.

17. Structure according to claim 16, wherein said height dimension (c) of said box is in the order of up to about 10 cm only.

18. Panel according to claim 15, wherein the depth dimension (a) of said box is up to about 2 cm only.

19. Panel according to claim 15, wherein the light radiation emitting lamp (3) comprises two halogen incandescent lamps.

* * * * *